March 10, 1936.  F. NIELSEN  2,033,352
WHEEL ALIGNMENT TESTER
Filed June 20, 1935
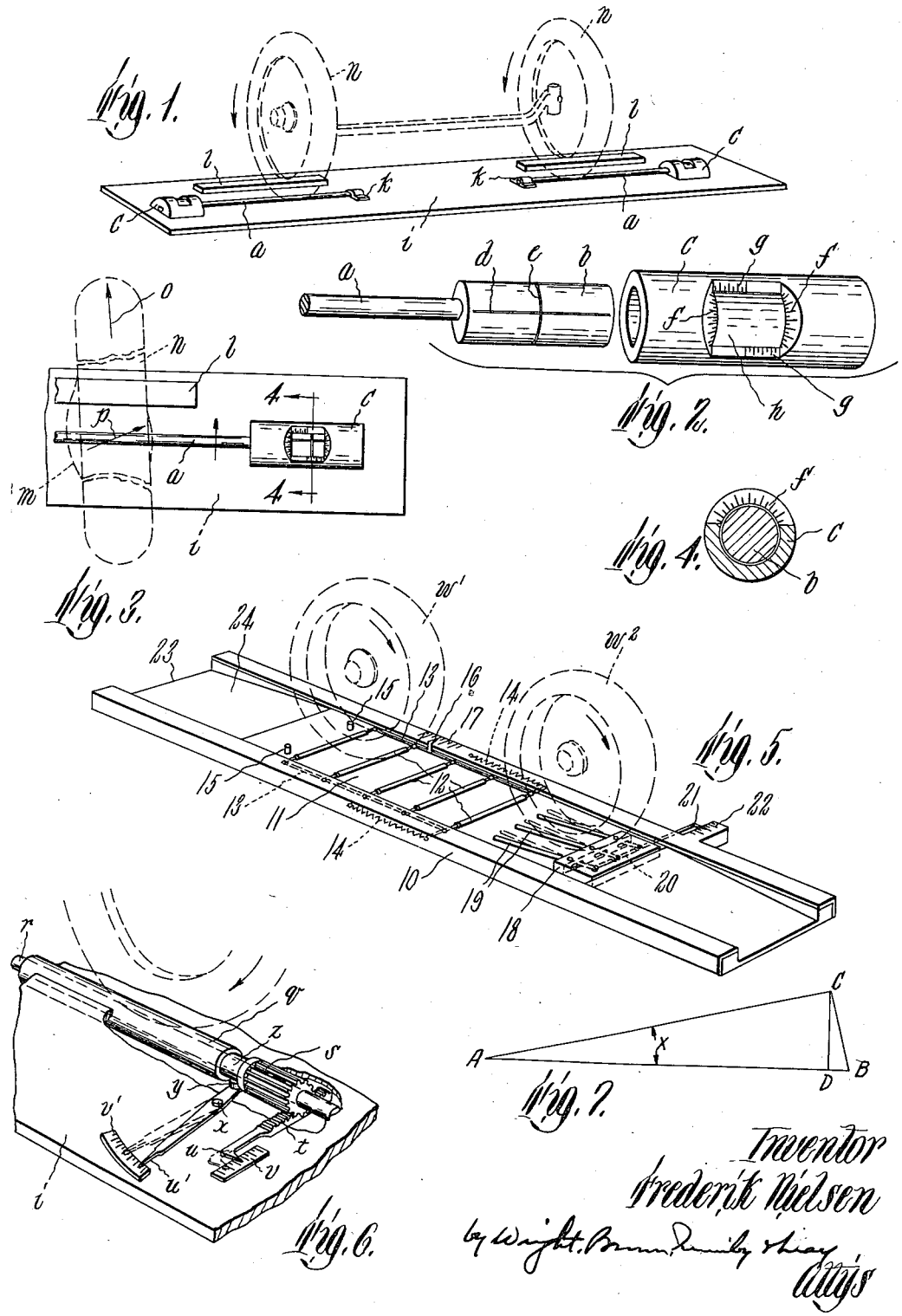
Inventor
Frederik Nielsen Patented Mar. 10, 1936

2,033,352

UNITED STATES PATENT OFFICE 2,033,352

WHEEL ALIGNMENT TESTER

Frederik Nielsen, Quincy, Mass.

Application June 20, 1935, Serial No. 27,469

17 Claims. (Cl. 33—203)

The purpose of the present invention is to provide a device for indicating lack of alignment of any wheel of an automobile, the direction of misalignment of any such wheel, and approximately the degree to which a misaligned wheel is out of alignment and the extent of adjustment necessary to correct the error.

In my use of the term "alignment" and words of related meaning in this specification I have reference to the angular relationship which is required to exist between the several wheels of an automoble to cause them to roll over the ground with minimum slip and drag. For instance, if the plane of any wheel is so inclined to the direction in which the entire car travels that its tendency in rolling on the ground is to diverge from the direction of the car, that wheel is out of alignment or misaligned. The wheels are correctly aligned if, when the steering wheels are set for travel in a straight line, all wheels tend to roll on the ground in parallel lines. This does not mean that the front and rear wheels at either side must necessarily be in the same plane when the car is steered in a straight line or that the two front wheels must be in parallel planes; for the planes of these wheels may be inclined to the vertical, for purposes well understood in the automobile art, without being misaligned in the sense of this specification. But a wheel is misaligned if it tends to "toe in" or "toe out", that is, if its horizontal diameter is inclined respectively inward or outward in the forward direction. Such misalignment occurs usually only in respect to the front wheels, the ones which are turned around substantially vertical pivots to right or left in steering the car; and as to such wheels it is a matter of somewhat frequent occurrence due to wear, faulty adjustment, or bending, of some part of the pivots or steering connections of these wheels. When a wheel is so misaligned its tire slips or drags on the ground and wear of the tire tread is excessive.

The flexibility of pneumatic tires, particularly those of the so called balloon type which are large and are inflated with moderate pressure, makes it difficult to determine by the means heretofore available for testing misalignment, the exact degree to which a wheel is out of line, and equally difficult, if not impossible, to determine whether an adjustment made to correct a misalignment known to exist has done so fully and without error in the opposite direction. This is because the tire is flattened and bulged crosswise by its contact with the ground, and is there distorted unevenly to one side or the other by the lateral drag of a misaligned wheel. I have designated by the term "tire bag" the eccentric or laterally displaced distortion of the tire which occurs on a misaligned wheel. The presence of such a tire bag and the forces constantly tending to restore the tire to symmetrical form cause the difficulty of determining these errors and accurately correcting them by the testing means heretofore available.

One of the objects of this invention is to eliminate the vitiating effect of the tire bag, above defined, on measurements made to determine the degree of misalignment of an automobile wheel; and not only that, but to utilize the forces tending to restore the tire to its normal symmetry as a means for checking the accuracy of a correcting adjustment. Another object is to provide means for indicating quantitatively, and with greater accuracy than heretofore, the degree or extent to which a misaligned wheel is out of alignment. Still a further object is to provide an indicating instrument which can be easily moved from place to place and put anywhere on the floor of a garage or on level ground, and there used with full and adequate effect to test automobile wheels for alignment.

In the drawing herewith,—

Fig. 1 is a perspective view of one form of testing indicator embodying the invention;

Fig. 2 is a perspective view of the disassembled parts of one of the indicating instruments shown on a larger scale than that of Fig. 1;

Fig. 3 is a plan view of one end of the testing device shown in Fig. 1;

Fig. 4 is a cross section on the same scale as Fig. 2 of the indicator instrument, the plane of section being that indicated by the line 4—4 in Fig. 3;

Fig. 5 is a perspective view of another form or embodiment of the testing device;

Fig. 6 is a perspective view of another modification;

Fig. 7 is a diagram analyzing the slipping or dragging action over the ground which takes place with respect to a misaligned wheel.

In explaining the principles of the invention attention is first directed to the diagram in Fig. 7. It is assumed that three of the wheels are in correct alignment and that the car is moved in the direction A—B, while the fourth wheel is inclined at an angle X with the line A—B. Starting from the point A, the misaligned wheel tends to roll in the direction A—C, which makes the assumed angle X with the line A—B. But being attached to the car it actually travels from A—B with a combination of rolling and sliding or dragging movements. Analyzed by the parallelogram of motions, the rolling component of the wheel's movement is equal to A—C and its sliding component to C—B. This sliding component in turn may be resolved into a component C—D perpendicular to the movement of the car and a second component D—B lengthwise of the car travel; i. e., a longitudinal component. The value of each component is proportional to the sine of the angle X and to the length of the line A—B.

My invention utilizes the component of longitudinal slip, D—B, in measuring the error of a misaligned wheel, and the component C—D in indicating the direction of misalignment; i. e., whether a wheel toes out or toes in. The means for doing this shown in Figs. 1-4 inclusive consists of a rod $a$ so mounted that an automobile wheel may run over it, and that it may both rotate about its axis and move endwise. To the rod is connected rigidly an index $b$ rotatably contained in a housing $c$ and having index marks $d$ and $e$ which cooperate with scales $f$, $f$ and $g$, $g$ respectively on the edges of a window $h$ in the side of housing $c$. Preferably the rod is mounted on the upper side of a wide and shallow base $i$ having sufficient thickness or depth to contain the part of the housing $c$ below the rod $a$, and in which the latter is set to a depth which holds the rod just clear of the upper surface of the base or allows it to rest lightly thereon. The housing is secured immovably in the base and forms the bearing for one end of the rod, as the index member $b$ has a close sliding fit within it. The other end of the rod is held by a bearing $k$, which is fastened to the base and fits the rod slidingly but closely enough to prevent any appreciable deflection.

Preferably two indicator instruments such as just described are assembled in a single apparatus, being both mounted on the base $i$ in alignment with one another and at such a distance apart that both may be engaged simultaneously with the two front wheels of a car; the base being of suitable dimensions for that purpose, substantially as shown by Fig. 1.

The base may be made of various materials in a variety of constructions; as, for instance, a thin metal plate braced and supported beneath so that the under part of the housing $c$ will be clear of the ground, as a wooden board faced with metal, a shallow box, or otherwise. Preferably it is light enough in weight so that it may be moved about from place to place on a garage floor and elsewhere, and may be picked up and stowed away when not in use. It is thin or shallow enough for a wheel to roll over it without appreciable lift, and may have a bevel or ramp at the edge over which the wheels first pass.

Since the errors under investigation are measured by the movement of the indicator with respect to the base, it is obvious that the base itself must not be displaced by the drag of the wheel passing over it; otherwise the indication will be indeterminate and without value. If friction alone is not sufficient to prevent slip of the base over the ground, it may be made fast otherwise, as by anchor members, or by being embedded more or less deeply into the ground or a floor or pavement. In effect then the specific structure designated in this drawing as a base becomes a part of the testing floor or the ground area over which the car is moved in making a test. Generically the term "base" as used in the following claims is intended to include not only structures such as those shown in the drawing and designated as bases, but also other supporting means on or by which movable members such as the rod $a$ and equivalent indicators hereinafter described, may be supported.

At a short distance back of each rod is an elevation or lifter $l$, here shown as a step having a vertical rise, but it may be inclined at the rising side to avoid indenting the tire, if desired. Its purpose is to lift the wheel as it passes over the rod enough to relieve the weight of the car while the tire is yet in contact with the rod. This is to give scope for the tire bag, defined in the introductory part of this specification, to be restored to the normal form of the tire, and in being restored, to operate the indicator. Such a tire bag is shown in an exaggerated way at $m$ in Fig. 3 in connection with the outline of the tire $n$, there shown by broken lines. This tire may be considered as that of the right hand wheel shown by broken lines in Fig. 1. This wheel is represented as having an inclination, in the direction of the arrow $o$, toward the center line of the car. In other words it toes in. The drag of the tire causes the bag to be displaced to the inner side and rear of the wheel. The dimensions and distortion of such a bag are unknown and variable quantities, depending on the stiffness and flexibility of the tire construction, the size of the tire, and its inflation pressure. But in any given tire and for any given degree of inflation and degree of misalignment of the wheel, the bag is fairly constant in its dimensions and position with respect to the ground after the wheel has been run to the distance at which the resilience and inflation pressure of the tire are sufficient to overcome the ground friction and cause slip. As the wheel rolls, different points of the tire form the bag; points at the rear of the ground contact area springing back into the symmetrical form of the tire as they leave the ground, and those in front of the contact area being progressively deflected as they come in contact with the ground and the center of the wheel passes over them. If the wheel is lifted bodily, the bag disappears as soon as the weight of and on the wheel is relieved.

In passing over the indicating instrument above described, the tire first rests on the rod $a$, and then mounts on the step $l$ at a short distance behind the rod. The step thus lifts the wheel until so much of the weight as previously rested on the rod is substantially relieved, but while the tire is still in contact with the rod. The tire bag then springs back to normal shape and in thus returning to form, its points in contact with the rod travel in a direction represented in a general way by the arrow $p$, thus moving the rod endwise and at the same time turning it about its axis. Its rotational movement is measured by the index $b$ mark $d$ with respect to the scales $f$, $f$, and its endwise displacement is measured by the index $e$ with respect to one or the other of the scales $g$, $g$. If the wheel toes in, this latter movement of the rod is outward; while if the wheel toes out, it is inward. These two indications then show both the direction, and approximately the extent, to which the wheel is out of line, and give information enabling proper correction to be made accurately and quickly.

By passing two wheels over two indicators simultaneously with movement of the automobile in a straight line, the sum of the angular movements of the two indicators is a measure of the extent to which the wheels toe out or toe in.

Step $l$ is a useful and highly important part of the apparatus, although not absolutely essential. Without it the drag of the tire over the substantial length of its flattened tangent contact with the ground area contiguous to the rod gives movement to the rod if the wheel is out of alignment. If, for instance, the flattening of the tire gives a tread contact area six inches long, the car will travel a distance of six inches from the time the wheel tread first comes to bear on the rod until it leaves the rod. This is enough for wheel drag to have its effect, if there is any drag. Even when the step is used, part of such drag affects the rod before the wheel mounts the step, for there must necessarily be some space between the rod and the step. The utility of the step consists mainly in that, by lifting the weight of the wheel from the rod, it largely relieves the frictional resistance to movement of the rod and permits the tire bag to spring back into shape while lightly resting on the rod, thereby giving increments of movement to the latter in addition to the movement first imparted by the drag of the tire.

In the use of the apparatus just described, and of all other embodiments of the invention as well, the wheel or wheels being tested roll freely over the ground without exerting tractive force on the ground and measuring rods. In other words, the wheels are not rotated by any other force than the advance of the car in coaction with ground friction. Hence, the movements given to the measuring instruments are those due wholly and exclusively to the drag and spring of the tire as described.

The form of this invention illustrated in Fig. 5 measures the wheel misalignment by its component of longitudinal slip while traveling a given distance longitudinally, without dissipation of the tire bag; and it makes use of the lateral slip, preferably augmented by sudden dissipation of the bag, to show the direction of such misalignment. This form of the invention consists of a frame 10 having a supporting surface 11 on which a number of parallel rods 12 are supported and enabled to roll. The ends of the rods are connected to one another by rigid links 13 occupying guideways in, or lying close beside, the side members of the frame. The rods may have trunnions at their ends rotatably contained in eyes in the ends of the links. Or an equivalent assemblage of grid-like longitudinal and transverse rods may be provided and roller sleeves mounted on the cross rods to rest and roll on the supporting surface 11. Springs 14 are connected with the ends of one of the rollers or rods, or some other convenient points of the assemblage, and are anchored to the frame in such manner that they normally hold the endmost cross rod or roll against two stop pins 15. An index 16 is carried by one of the links and cooperates with a scale 17 on the adjacent side member of the frame.

Beyond the last rod or roller 12 (in the direction in which the wheel travels when being tested) is a lifter 18 to which are pivotally connected a number of rods 19 projecting toward the rod and link assemblage previously described and capable of moving about their pivots transversely of the direction of wheel travel. These latter rods extend beyond their pivots and are connected with a cross rod 20 which carries an index 21 adjacent to a scale 22.

The wheel to be tested enters the device at the end 23 and travels toward the other end, occupying successively the positions shown by the broken lines at $w'$ and $w^2$, as well as other positions. It rolls over the rods or rollers 12, one after the other, and its component of longitudinal slip (represented by D—B in Fig. 7), if the wheel is out of line, moves the rods or rollers in the same direction. The index 16 shows on scale 17 the sum of the movements thus given successively to the different rods. As the outermost rods are at a known distance apart, the graduations of the scale may be marked to read directly in terms of the angle between the horizontal diameter of the wheel and the direction in which the wheel is moved. Preferably a ramp 24 is provided at the entrance end of the device in order to insure retention of whatever distortion is acquired by the tire in approaching the rods or rolls 12, so that the effect of the tire on these rods will be that of the tire in equilibrium between the forces tending to distort and to restore it, thus making the displacement of the rods a correct measure of the longitudinal drag due to wheel misalignment.

After leaving the last one of these rollers, the wheel passes over the longitudinally extending parallel rods 19, whereupon its lateral component of slip moves these rods sidewise. When the wheel mounts on the step 18, the tire bag, in restoring itself to true form, gives an additional movement to the rods 19. The index 21, being moved transversly at the same time, shows the direction in which the wheel is inclined from the true direction.

It will be appreciated that both forms thus far described operate on the same principle, of utilizing the longitudinal slip of the tire to indicate the extent of deflection of the wheel, and the lateral slip to show its direction.

Fig. 6 is a variation of the form first described in which, instead of there being a rotatable and endwise movable rod, a sleeve $q$ is mounted to move endwise and turn on a stationary supporting rod $r$. The latter is secured in or on a base $i$ and the sleeve is located where the wheel may run over it, and preferably it is sunk within the base so far as to leave only a minor portion of its circumference projecting above the base. Rigidly connected with the sleeve is a wide faced pinion $s$ in mesh with a rack $t$ which carries an index $u$ adjacent to a scale $v$. Another index $u'$ cooperates with a scale $v'$ and is pivoted at $x$, carrying a roll or finger $y$ in a groove $z$ in the sleeve. Rotation of the sleeve moves the index $u$ to measure the longitudinal component of tire slip, while endwise displacement of the sleeve moves index $u'$ to show the direction of wheel deflection. A step such as that shown at $l$, or its equivalent, may be arranged here to operate as and for the same purpose previously described.

The form shown in Fig. 6 may also be used by rolling the wheel lengthwise of the sleeve in the manner indicated by the broken lines (representing a tire) and the arrow applied thereto in that figure. The partial sinking of the sleeve into the base enables the tire thus to run lengthwise without rolling sidewise from the sleeve, and its frictional contact with the base at either side maintains the tire distortion, due to drag if the wheel is misaligned, substantially constant, whereby the longitudinal and lateral components of tire drag are exerted on the sleeve with correct indicating effect. In this mode of use, however, the index $u'$ indicates the longitudinal slip and the index $u$ the lateral slip. As the sleeve may be made of any desired length (not necessarily as short as here shown), for instance half the circumference of the tire tread, or the whole circumference, scope is thus afforded for integrating the tire slip over a substantial distance, and thereby giving a large movement to the indicator.

I may observe at this point that it is within my contemplation to apply multiplying leverages of known character to any of the index members used with the various embodiments of my indicating device, whereby to give readings on an enlarged scale.

Sleeves mounted on axle or pivot rods, equivalent to the sleeve $q$ and rod $r$, may be substituted for the pivoted rods 19 shown in Fig. 5. The action of the tire described in connection with the explanation of the rods 19 then produces a partial rotation of such sleeves mounted on stationary axle rods, which rotation is measured by an index, or indexes, coupled with one or more of the sleeves by a pinion and rack couple, like that shown in Fig. 6, or an equivalent connection.

Each of the measuring indicators may be duplicated and used simultaneously with both front wheels of the car, substantially as described with respect to the indicators shown in Fig. 1, and with similar effect.

Some of the possible variants of the invention have been thus described to illustrate the wide variety of specific forms in which these principles may be embodied. These illustrations do not by any means exhaust the possibilities, but I believe that I have shown sufficient to make it clear that the principles which I claim are not limited exclusively to these specific disclosures.

What I claim and desire to secure by Letters Patent is:

1. A wheel alignment tester comprising the combination with a base having an extended wheel-supporting surface, of a movable member mounted on said base in position to permit contacting passage over it of a wheel to be tested while supported by the base, said member having freedom for a component of movement in the direction of travel of the wheel.

2. A wheel alignment tester comprising the combination with a base having an extended wheel-supporting surface, of a movable member mounted on said base in position to permit rolling over it of a wheel to be tested, said member being arranged to be moved by the traveling wheel, with a component of movement in the direction of travel of the wheel, and index means for measuring the extent of such movement.

3. A wheel alignment tester comprising the combination with a base having an extended wheel-supporting surface, of a movable member mounted on said base in position to permit rolling over it of a wheel to be tested, said member being arranged to be moved by the traveling wheel, with components of movement both lengthwise and transversely of the wheel travel.

4. A wheel alignment tester comprising the combination with a base having an extended wheel-supporting surface, of a movable member mounted on said base in position to permit rolling over it of a wheel to be tested, said member being organized to be moved by the traveling wheel, with components of movement both lengthwise and transversely of the wheel travel, and index means for measuring separately the extent of each such component.

5. A wheel alignment tester comprising the combination with a base over which a wheel to be tested may be rolled, of a member supported on said base in position to be rolled over by the wheel and being movable bodily in the direction of wheel travel by drag of the wheel in that direction.

6. A wheel alignment tester comprising the combination with a base over which a wheel to be tested may be rolled, of a member supported on said base in position to be rolled over by the wheel and adapted to be displaced bodily in the direction of wheel travel by drag of the wheel in that direction, and index means for measuring the extent of such displacement.

7. A wheel alignment tester comprising the combination with supporting means having an upper, substantially horizontal, surface on which wheels to be tested may rest and roll, of a substantially cylindrical member resting on said surface in position to be rolled over transversely of its length by a wheel being tested, said cylindrical member being adapted to be rolled bodily on said surface by the longitudinal drag exerted by the wheel tire while rolling over it.

8. A wheel alignment tester comprising the combination with a base on which wheels to be tested may be supported and rolled, of a substantially cylindrical member rotatably mounted adjacent to the wheel-supporting surface of said base and being located so that a wheel to be tested may roll over it transversely of its length, said cylindrical member being rotatable by longitudinal drag of the wheel while rolling on the base, and index means for measuring the extent of the linear component of angular motion thus imparted by wheel drag.

9. A device for indicating misalignment of automobile wheels equipped with pneumatic tires comprising the combination with a base, of a wheel lifting rise on the base over which such a misaligned wheel may be rolled with movement of the automobile with which the wheel is connected, and a movable member on the base in front of the rise in position to be passed over by the tire before mounting the rise, while remaining in contact with the tire as the wheel rises upon the rise, whereby a tire, distorted by drag over the ground in consequence of wheel misalignment, in returning to normal shape is enabled to move said member.

10. In an apparatus for indicating misalignment of an automobile wheel by utilizing the distortion of a pneumatic tire resulting from progress over the ground of such a misaligned wheel, the combination with a base of a movable member on said base adapted to be passed over by an automobile wheel in the progress of the automobile, and means associated therewith for causing the weight of the wheel to be relieved from said movable member while the tire remains in contact threwith, whereby the movement of the tire in returning to normal shape is caused to shift the movable member and thus indicate the direction of misalignment of the wheel.

11. An alignment tester for automobile wheels comprising a base over which such a wheel may be passed in the progress of the automobile to which it is connected, a rotatable and endwise movable member mounted close to the upper surface of the base to be passed over by such wheel, and means for lifting the wheel while its tire remains in contact with said member sufficiently to relieve the tire from restraining contact with the surface of the base contiguous to the member, to permit either endwise or rotary movement of the member by restoration of a distorted tire to normal shape.

12. A testing apparatus as and for the purpose described comprising a base, a cylindrical member rotatably and endwise movably mounted on the base close to the surface thereof so as to be moved by frictional drag of a misaligned automobile wheel passing over it in the progress of the automobile to which the wheel is connected, and index means connected with said member and organized to measure the endwise and rotary movements thereof from a given position.

13. A testing apparatus as and for the purpose described comprising a cylindrical member rotatably and endwise movably mounted on a supporting surface for passage thereover of an automobile wheel in the progress of the automobile to which the wheel is connected, index means connected with said member and organized to measure the endwise and rotary movements thereof from a given position, and a wheel lifter rising to a higher level than such surface adjacent to said member in the path of the wheel.

14. A wheel alignment tester for automobile wheels comprising a series of rollers substantially parallel to one another on a supporting surface over which they may roll bodily in directions transverse to their length, and connecting means extending from each roller to the next holding them at an invariable distance from one another, said rollers arranged to be passed over and frictionally engaged by an automobile wheel in the progress of the automobile and to be moved by the drag of the wheel in the direction of such progress if the wheel is out of alignment with the line of progress.

15. A wheel alignment tester comprising a gridlike assemblage of longitudinal and transverse members, combined with a supporting surface on which said transverse members rest with capacity for displacement, adapted to be passed over and frictionally engaged by the wheel of an automobile in the progress of the automobile lengthwise of said longitudinal members, and means for measuring the shift of the assemblage resulting from such movement over it of a wheel out of alignment with the direction of progress of the automobile.

16. The method of determining misalignment of an automobile wheel equipped with a pneumatic tire which consists in advancing an automobile to which said wheel is connected, while permitting the wheel to roll freely, until the distortion of the tire due to drag on the ground has substantially become a maximum, then passing the wheel over a movable body and, while the tire remains in contact with such body, causing the wheel to be raised until the tire is free to spring back to normal shape, and measuring the displacement of the movable body caused by such restoration to normal shape of the tire.

17. The method of determining misalignment of an automobile wheel which consists in advancing the automobile to which the wheel is connected in a direction causing the wheel to pass over a body which is movable in the same direction, the wheel being permitted to roll freely without extractive force on such body, and measuring the distance to which the body is moved by the drag of the wheel in the direction of travel of the automobile.

FREDERIK NIELSEN.